L. D. PFAU.
POWER TRANSMITTING APPARATUS.
APPLICATION FILED FEB. 27, 1917.
1,264,125. Patented Apr. 23, 1918.
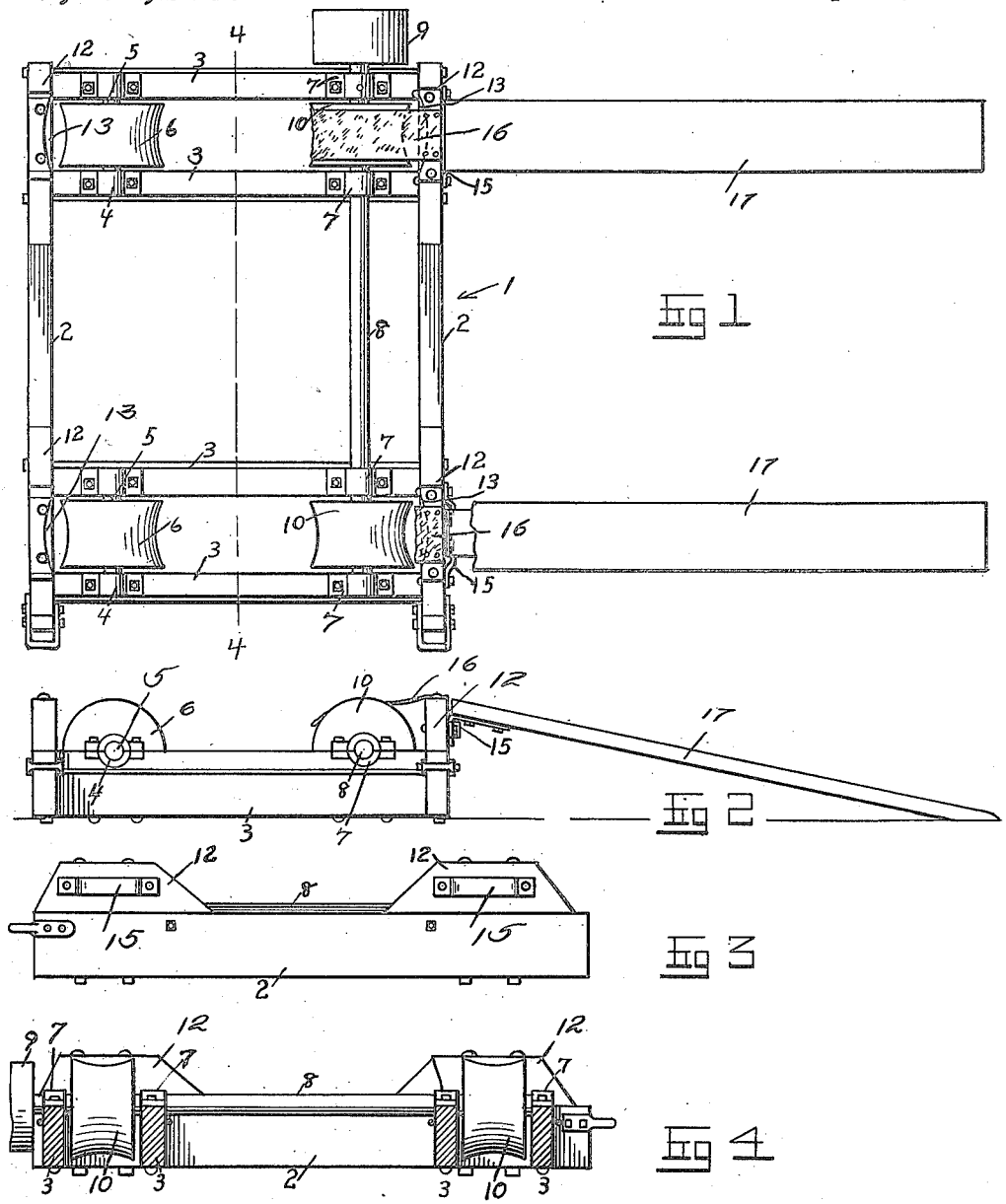

UNITED STATES PATENT OFFICE.

LEO D. PFAU, OF FREEPORT, MINNESOTA.

POWER-TRANSMITTING APPARATUS.

1,264,125.

Specification of Letters Patent.  Patented Apr. 23, 1918.

Application filed February 27, 1917. Serial No. 151,322.

*To all whom it may concern:*

Be it known that I, LEO D. PFAU, a citizen of the United States, residing at Freeport, in the county of Stearns, State of Minnesota, have invented certain new and useful Improvements in Power-Transmitting Apparatus; and I do hereby declare the following to be a full, clear, and exact description of the invention, such as will enable others skilled in the art to which it appertains to make and use the same.

The present invention is directed to improvements in power transmitting apparatus, and has for its object to provide a device of this character in such a manner that an automobile can be engaged therewith so that the power from the rear drive wheels can be utilized for driving machines such as sewing machines, feed grinders, and corn threshers, or in fact any machine requiring a similar amount of power.

A further object of the invention is to provide a device of this character constructed in such a manner that the same can be operated effectively with the wheels of an automobile equipped with tires which vary in circumference.

With these and other objects in view, this invention resides in the novel features of construction, formation, combination and arrangement of parts to be hereinafter more fully described, claimed and illustrated in the accompanying drawing, in which:—

Figure 1 is a plan view of the device,

Fig. 2 is a side elevation thereof,

Fig. 3 is a front view, and

Fig. 4 is a sectional view on line 4—4 of Fig. 1.

Referring to the drawings 1 indicates a frame which consists of end bars 2, connected by pairs of spaced sills 3, said sills being provided near one end of the frame with boxes 4 for supporting the alined shafts 5, which have fixed thereto grooved wheels or rollers 6. Mounted on the sills 3 at the opposite end of the frame are boxes 7 in which is journaled the shaft 8 which extends parallel with the shafts 5 and has one end extended beyond the adjacent outermost sill 3 in order to receive in fixed relation the belt pulley 9. Fixed to the shaft 8 and between the sills 3 so as to be alined with the wheels 6 are rollers 10.

The bars 2 are provided adjacent their outer ends with vertical extensions 12 which have their upper edges provided with channels 13 so that the wheels of the automobile can conveniently pass to engage the rollers 6 and 10. Running boards or skids 17 are provided and have their ends rested or supported on brackets 15 which are secured to the outer face of one bar 2 below a pair of the extensions 12 so that the automobile can be propelled under its own power until the tires of the rear wheels will engage the rollers 6 and 10, the latter when driven imparting rotary movement to the shaft 8.

By providing the short shafts 5 it is possible to use tires of unequal circumference on the power device without injuring the tires, since the wheels 6 can travel at different speeds. If the wheels 6 were secured to a common shaft it is obvious that the frictional engagement between the tires and wheels would injure the tires. Thus it will be seen that an automobile can be used having one tire equipped with a non-skid surface, the power shaft 8 being driven at a constant speed, and the idler or supporting wheels 6 compensating for any speed variations in the tire surfaces.

When it is desired to remove the car from the power device, strips of canvas or belting 16, which are secured by their ends to the bar 2 in line with the skids and the rollers 10, are projected between the latter and the tires of the automobile wheels. Then, when the machine is driven forwardly, the wheels may ride off of the rollers 6 and 10 without difficulty.

What is claimed is:—

A device of the class described, comprising a frame, a power shaft extending across the frame, rollers fixed to said power shaft, idler rollers alined with the first named wheels, skid devices for elevating automobile wheels onto the rollers, and a means to be stretched from the frame at said skids onto the adjacent rollers in interposed relation between the automobile wheels and the rollers as a traction surface to permit the wheels to run off of the rollers.

In testimony whereof, I affix my signature, in the presence of two witnesses.

LEO D. PFAU.

Witnesses:
H. B. WELLE,
JOHN A. PFAU.